(12) United States Patent
Puccio

(10) Patent No.: US 10,240,378 B1
(45) Date of Patent: Mar. 26, 2019

(54) OVEN COVER SYSTEM

(71) Applicant: Bartolomeo Puccio, Whitestone, NY (US)

(72) Inventor: Bartolomeo Puccio, Whitestone, NY (US)

( * ) Notice: Subject to any disclaimer, the term of this patent is extended or adjusted under 35 U.S.C. 154(b) by 0 days.

(21) Appl. No.: 15/981,187

(22) Filed: May 16, 2018

(51) Int. Cl.
*E05D 15/06* (2006.01)
*F24C 15/02* (2006.01)

(52) U.S. Cl.
CPC ........ *E05D 15/0656* (2013.01); *F24C 15/028* (2013.01); *E05Y 2900/308* (2013.01)

(58) Field of Classification Search
CPC ........... E05Y 2900/30; E05Y 2900/302; E05Y 2900/304; E05Y 2900/306; E05Y 2900/308; E05Y 2900/31; E05Y 2900/312; E06B 3/4654; E06B 3/4672; E06B 3/4663; A21B 3/02; F24C 15/023; Y10T 16/364; Y10T 16/373; E05D 15/0656
See application file for complete search history.

(56) References Cited

U.S. PATENT DOCUMENTS

| 4,022,183 A * | 5/1977 | Martin ..................... F24C 14/02 126/200 |
| 4,503,837 A | 3/1985 | Smith et al. |
| 4,772,243 A * | 9/1988 | Zeiss ................... A63H 33/3055 126/191 |
| 4,817,584 A | 4/1989 | Wilker |
| 5,709,142 A * | 1/1998 | Nersesian ............. A47J 37/043 99/341 |
| 6,581,588 B2 | 6/2003 | Wiedemann et al. |
| 7,703,451 B2 | 4/2010 | Bang |
| 7,921,768 B2 | 4/2011 | Fernandez et al. |
| 9,377,204 B2 | 6/2016 | Plevacova et al. |
| 2007/0251519 A1 * | 11/2007 | Anikhindi ............... E05D 15/20 126/194 |
| 2008/0156201 A1 * | 7/2008 | Cook ....................... A21B 1/44 99/443 R |
| 2013/0174831 A1 * | 7/2013 | Shaffer ................. F24C 15/023 126/190 |

* cited by examiner

*Primary Examiner* — Justin B Rephann
(74) *Attorney, Agent, or Firm* — Scully, Scott, Murphy & Presser, P.C.

(57) ABSTRACT

The present disclosure is directed to an oven cover system that includes an upper track configured for securing to an oven along a length of the upper track, the upper track configured to comprise a upper track slot along a distance of the upper track; a substantially rectangular panel configured to extend over an oven opening, the panel having a length direction dimension and a width direction dimension, the substantially rectangular panel comprising at least one bracket configured to operably connect the substantially rectangular panel to the upper track through the upper track slot; and a lower track that is substantially parallel with the upper track, a length of the lower track being shorter than the length of the upper track, wherein the substantially rectangular panel is configured to be within a lower track slot of the lower track.

8 Claims, 4 Drawing Sheets

OVEN COVER SYSTEM

BACKGROUND OF THE DISCLOSURE

Typical ovens have an opening that is either left open, or covered with a door or the like. When a typical oven is designed to include a fixed opening, much heat is lost through this opening during use of the oven. This is undesirable because of added heat requirements to maintain an internal temperature of the oven, and because users of the oven are exposed to the exiting heat.

What is desired is a device and method for conserving heat within an oven, and protecting users of the oven from being exposed to lost heat. Embodiments of the present disclosure provide methods that address the above and other issues.

SUMMARY OF THE DISCLOSURE

The present disclosure is directed to an oven cover system. The oven cover system includes an upper track configured for securing to an oven along a length of the upper track, the upper track configured to comprise a upper track slot along a distance of the upper track; a substantially rectangular panel configured to extend over an oven opening, the panel having a length direction dimension and a width direction dimension, the substantially rectangular panel comprising at least one bracket configured to operably connect the substantially rectangular panel to the upper track through the upper track slot; and a lower track that is substantially parallel with the upper track, the lower track configured for securing to the oven a distance away from the upper track, a length of the lower track being shorter than the length of the upper track, wherein the substantially rectangular panel is configured to be within a lower track slot of the lower track.

BRIEF DESCRIPTION OF THE DRAWINGS

The present disclosure will be better understood by reference to the following drawings of which.

DETAILED DESCRIPTION OF THE DISCLOSURE

Figure 1:
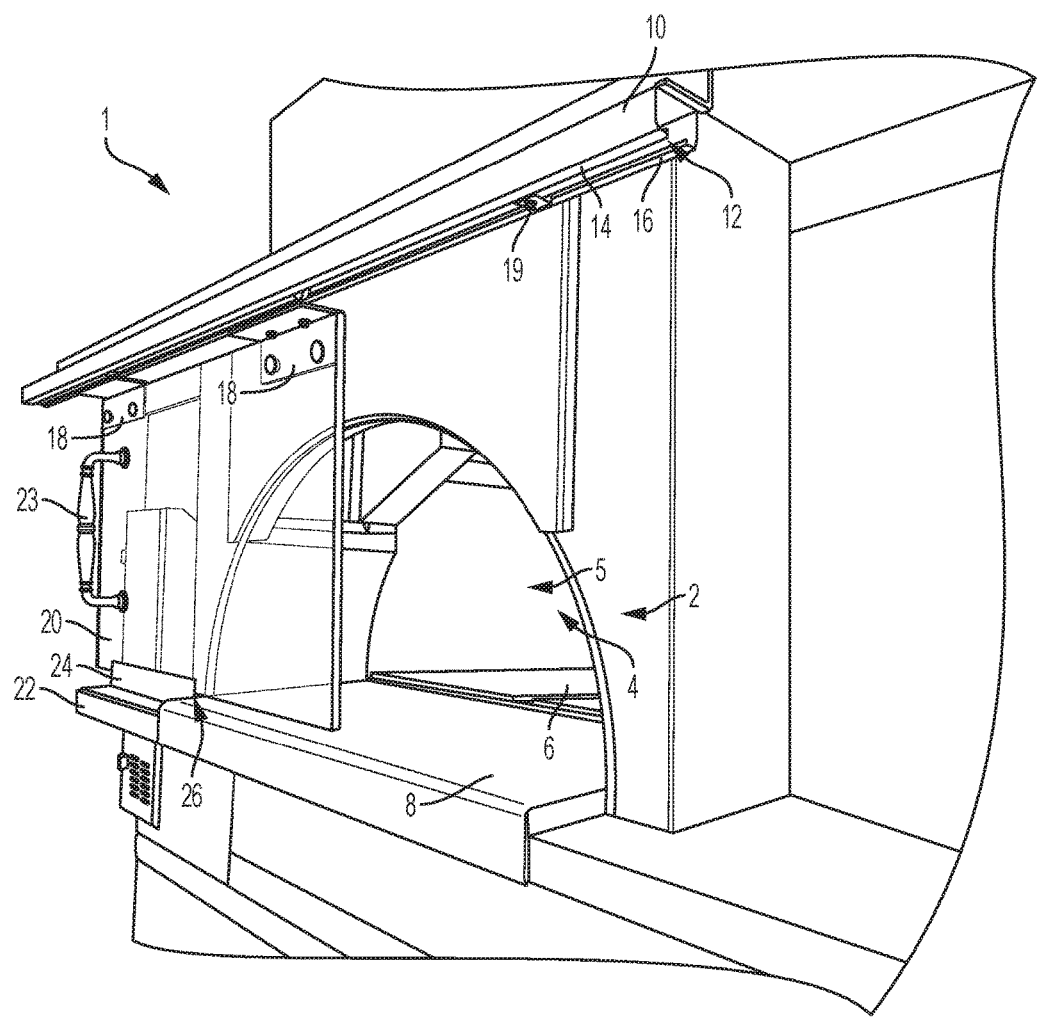
FIG. 1 is a perspective view of an oven cover system.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

In the discussion and claims herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

As used herein, the term "substantially", or "substantial", is equally applicable when used in a negative connotation to refer to the complete or near complete lack of an action, characteristic, property, state, structure, item, or result. For example, a surface that is "substantially" flat would either be completely flat, or so nearly flat that the effect would be the same as if it were completely flat.

As used herein terms such as "a", "an" and "the" are not intended to refer to only a singular entity, but include the general class of which a specific example may be used for illustration.

As used herein, terms defined in the singular are intended to include those terms defined in the plural and vice versa.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc. In yet another illustration, reference herein to a range of from "5 to 10" includes whole numbers of 5, 6, 7, 8, 9, and 10, and fractional numbers 5.1, 5.2, 5.3, 5.4, 5.5, 5.6, 5.7, 5.8, 5.9, etc.

As used herein, the term "oven" refers to any oven, strove or other device that includes one or more chambers in which a product may be baked, dried and/or exposed to heat. The heat can be created from within the one or more chambers themselves (such as in a wood burning oven where the wood is within one or more of the chambers of the oven, for example) or heat can be added by one or more of conduction, convection and radiation to the interior of the one or more chambers (such as in a natural gas burning or electric ovens, for example).

The one or more chambers of the oven can be formed of any suitable material, such as metal, ceramic, glass, stone, poured materials such as concrete, clay, earth, masonry (such as brick and/or concrete block) and combinations thereof.

An embodiment of an oven cover system 1 is shown in FIG. 1. As can be seen in FIG. 1, an oven 2 has an exterior surface, and a chamber 4. The chamber 4 has a lower surface 6, upon which various items can be placed, such as pizzas, breads, and other items that care configured to receive heat.

The oven 2 also includes an oven shelf 8, which is substantially in the same plane as the lower surface 6 and can be operably attached to the oven 2 in any suitable way. Further, the oven 2 includes an oven opening 5, which provides access to chamber 4. In this embodiment oven opening 5 is hemispherical, but in other embodiments, the oven opening can be any suitable shape, such as rectangular, circular, etc.

Operably attached to oven 2 is upper track 10. Upper track 10 is operably attached to oven 2 in any suitable way, such as by a mechanical connection, such as a bolt or clamp, by an adhesive connection, or combinations of mechanical and adhesive connections.

The upper track 10 can be any suitable length that extends across the oven 2, and/or the oven opening 5 or any portion of either.

The upper track 10 includes an upper track slot 12 that extends along the entire portion of upper track 10, or any suitable portion thereof. The upper track slot 12 forms a front edge 14 and a rear edge 16, which are configured to support a roller or other suitable sliding and/or rolling mechanism.

In the embodiment of FIG. 1, the front edge 14 and the rear edge 16 are configured to support a roller (not shown in this figure) along the length of the upper track slot 12. The roller is operably connected to at least one bracket 18 (in this embodiment two brackets 18) through the upper track slot 12.

The at least one bracket 18 is operably attached to a substantially rectangular panel 20. The at least one bracket 18 supports the weight of the substantially rectangular panel 20, and allows for the substantially rectangular panel 20 to slide along a plane formed by the upper track slot 12.

The substantially rectangular panel 20 can be formed of any suitable material that can withstand exposure to heat of at least 450° F. or greater for extended periods of time, such as glasses, glass based materials, plastic, plastic based materials, and combinations thereof. The substantially rectangular panel 20 can be transparent, substantially transparent, translucent or substantially translucent.

The substantially rectangular panel 20 can be formed of one or more layers of the same or different materials. If the substantially rectangular panel 20 is formed of two or more layers of material, there may be a gap filled with a gas and/or liquid between the layers, the layers can be in contact with one another, or the layers can have interplaced layers of adhesives or other suitable components.

Each of the one or more layers of the substantially rectangular panel 20 can be any suitable thickness, such as, for example about ⅛", about "¼", about ⅜", about ½", about ⅝", about ¾", about ⅞", about 1", about 1.25", about 1.5", about 1.75", about 2", about 2.5", about 3" or greater.

The substantially rectangular panel 20 can be dimensioned to be any height and length dimension that can cover a portion of, or the entirety of the oven opening 5.

The substantially rectangular panel 20 can be configured to contact or nearly contact the oven 2 about the periphery of oven opening 5. Also the substantially rectangular panel 20 can be configured to contact or nearly contact the oven shelf 8. Although not shown in this embodiment, an optional seal can be included between the substantially rectangular panel 20 and at least a portion of, or the entirety of, the oven 2 about the periphery of oven opening 5. This optional seal can be formed of fibrous material, ceramic material, plastic material, rubber material, metal material, glass material, and combinations thereof.

The substantially rectangular panel 20 includes in this embodiment an optional handle 23, which can be connected to the substantially rectangular panel 20 in any suitable way, such as mechanically and/or adhesively. The handle 23 can be contacted by a user and can cause the substantially rectangular panel 20 to slide along the length of the upper track 10. In this embodiment, the handle 23 is substantially perpendicular to the upper track 10, but in other embodiments, the handle 23 can be in any suitable location and orientation.

The oven 2 can also include a side oven shelf 22, which can be a continuation of oven shelf 8, or can be a separate shelf of the same or similar height as compared to the oven shelf 8. Side oven shelf 22 is substantially in the same plane as the lower surface 6 and can be operably attached to the oven 2 in any suitable way.

The side oven shelf 22 supports a lower track 24, the lower track 24 being operably attached to the side oven shelf 22 in any suitable way. The lower track 24 can be a single piece of material that includes a lower slot 26 therethrough, or multiple pieces of material spaced apart to form the lower slot 26 therethrough. The lower slot 26 is dimensioned so accept the thickness of the substantially rectangular panel 20 and allow the substantially rectangular panel 20 to pass therethrough. As can be seen from FIG. 1, the lower track 24 is substantially parallel with the upper track 10, and has an overall length of the lower track 24 is smaller than the upper track 10.

Figure 2:
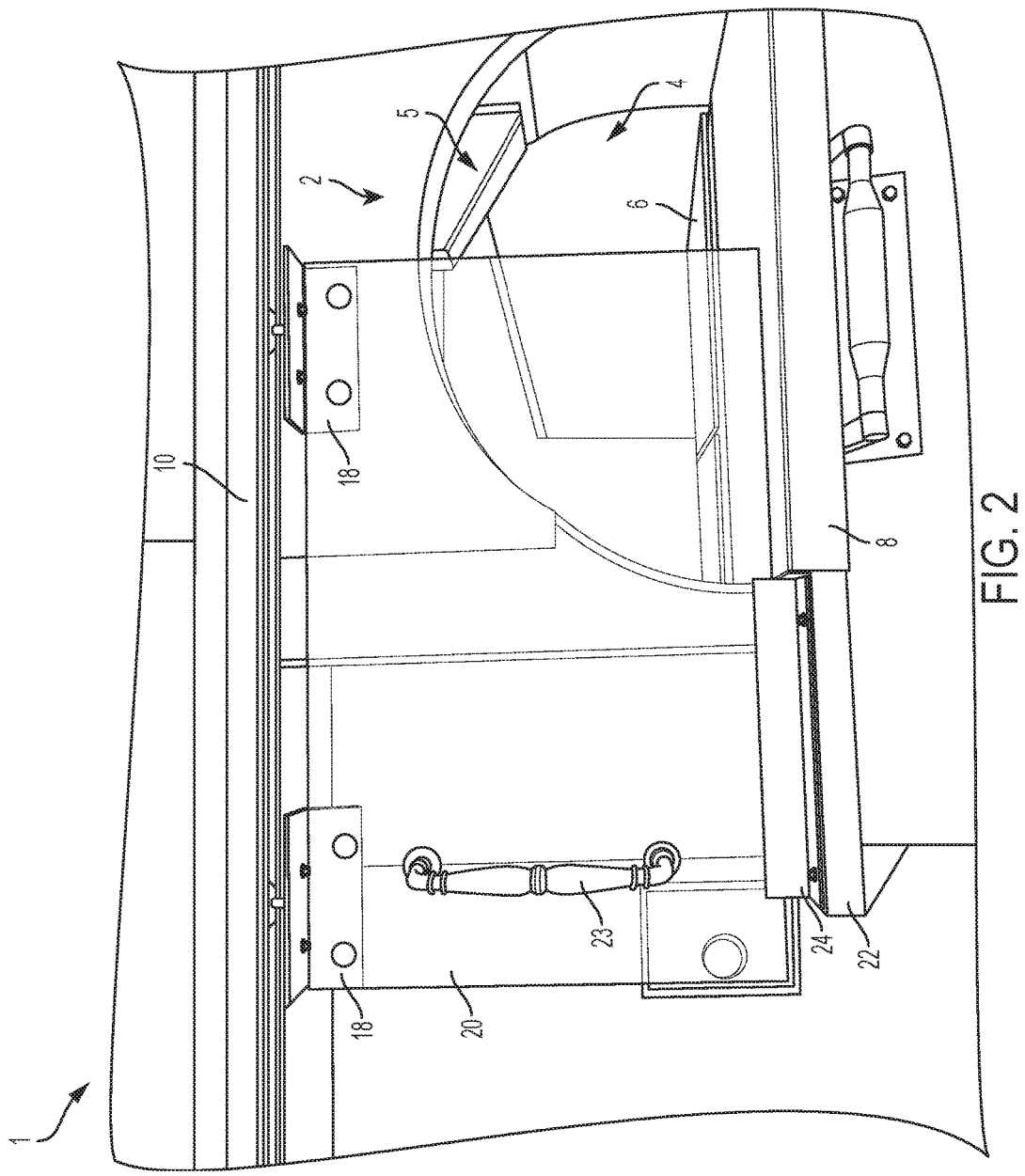
FIG. 2 is a front view of the oven cover system.

As can be seen from FIG. 1, the lower track 24 is offset from the oven opening 5 and thus does not impeded objects sliding in and out of the oven opening 5. This offset is better seen in FIG. 2, a front view of the oven cover system 1. As can be seen in FIG. 2, no portion of the lower track 24 extends past the edge of oven opening 5. The oven cover system 1 can be designed so that the bracket 18 contacts a stop 19, to prevent the substantially rectangular panel 20 from exiting the upper track slot 12 towards the right hand side of FIG. 2. The location of this stop can also ensure that the substantially rectangular panel 20 does not completely exit the lower slot 26 when the bracket 18 contacts the stop 19. The stop 19 position can be adjusted, or in other embodiments, stop 19 can be removed.

Figure 3:
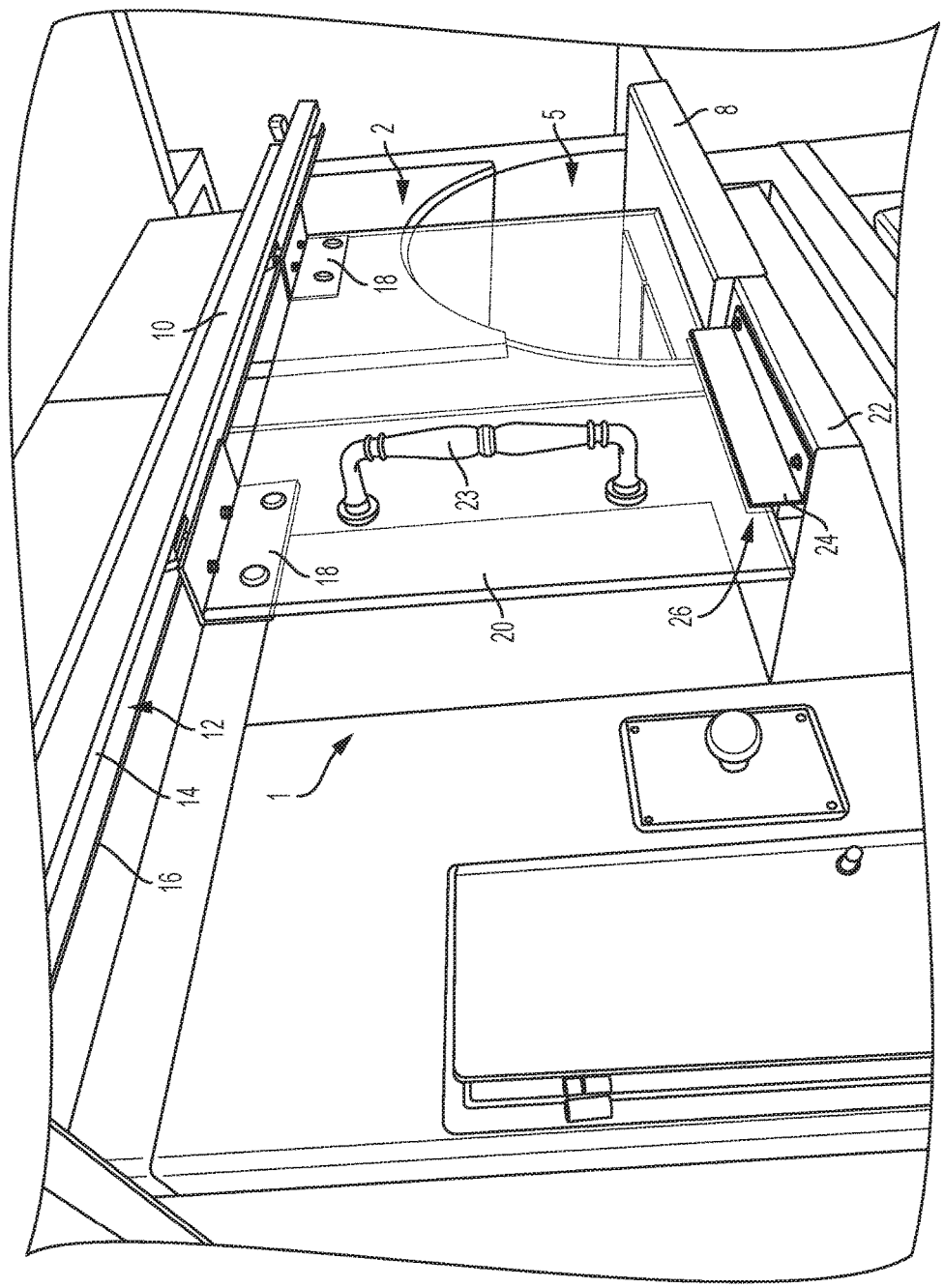
FIG. 3 is a perspective view of the oven cover system.

A further angle of the oven cover system 1 is shown in FIG. 3, which provides a perspective view of the substantially rectangular panel 20 passing through the lower slot 26. Although the substantially rectangular panel 20 is shown at about the same position as compared to the oven opening 5 in these figures, the substantially rectangular panel 20 can be slid along upper the upper track 10 so that the oven opening 5 is complete covered, so that the oven opening is completely uncovered, or any position in between covered and uncovered.

Figure 4:
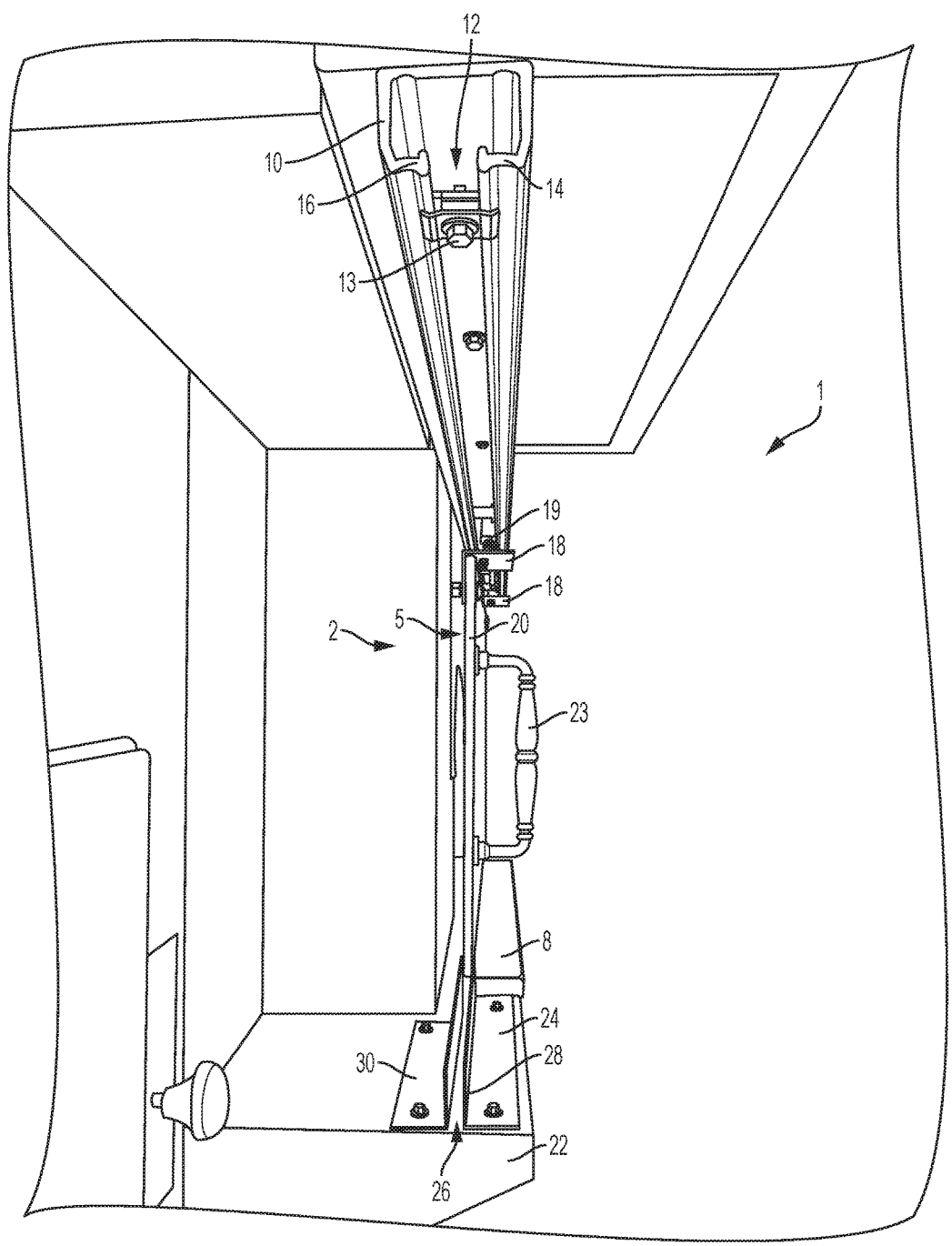
FIG. 4 is a side view of the oven cover system.

A side view side view of oven cover system 1 is shown in FIG. 4. In this figure, a roller 19 being operably connected to the bracket 18 is shown as resting on the front edge and the rear edge 16, with the roller 19 configured to roll along the length of the upper track slot 12.

The lower track 24, in this embodiment, includes a front track 28 and a rear track 30 sufficiently spaced from each other to allow for lower slot 26. Thus, front track 28 and rear track 30 are a distance apart from each other that is larger than a thickness of the substantially rectangular panel 20, by any amount desired. In this embodiment the front track 28 and the rear track 30 are each operably fixed to the side oven shelf 22.

The distance between the substantially rectangular panel 20 and the oven 2 can be adjusted as desired. As shown in FIG. 4, there is little space between the substantially rectangular panel 20 and the oven 2. In other embodiments a larger space can be created between the substantially rectangular panel 20 and the oven 2.

In this view, stop 13 can be seen, which contacts bracket 18 when the substantially rectangular panel 20 is slid towards the left (left direction in FIGS. 1-3). The stop 13 position can be adjusted, or in other embodiments, stop 13 can be removed so that the bracket 18, and the substantially rectangular panel 20, can exit the upper track 10 and the lower track 24.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

The invention claimed is:

1. An oven cover system, the system comprising:
    an upper track configured for securing to an oven along a length of the upper track, the upper track configured to comprise an upper track slot along a distance of the upper track;
    a substantially rectangular panel configured to extend over an oven opening, the panel having a length direction dimension and a width direction dimension, the substantially rectangular panel comprising at least one bracket configured to operably connect the substantially rectangular panel to the upper track through the upper track slot; and
    a lower track that is substantially parallel with the upper track, the lower track configured for securing to the oven a distance away from the upper track, a length of the lower track being shorter than the length of the upper track, wherein the substantially rectangular panel is configured to be within a lower track slot of the lower track, and wherein the lower track comprises a front track and a rear track spaced apart and forming the lower slot between the front track and the rear track, wherein the substantially rectangular panel is configured to slide through the lower slot without a mechanical connection to the lower slot.

2. The oven cover system of claim 1, wherein the lower track is spaced a distance away from an opening of the oven.

3. The oven cover system of claim 1, further comprising a handle on the substantially rectangular panel that is substantially perpendicular to the upper track.

4. The oven cover system of claim 1, wherein the lower track is configured to slidably contain the panel, the front track and the rear track spaced apart from each other a distance that is larger than a thickness of the substantially rectangular panel.

5. The oven cover system of claim 1, wherein the upper track further comprises a first stop configured to contact the at least one bracket.

6. The oven cover system of claim 5, wherein when the bracket contacts the first stop, the substantially rectangular panel is within the lower track slot.

7. The oven cover system of claim 5, wherein when the bracket contacts the second stop, the substantially rectangular panel is only partially within the lower track slot.

8. The oven cover system of claim 1, wherein the upper track further comprises a second stop configured to contact the at least one bracket.

* * * * *